J. M. KEIL.
TRIP MECHANISM FOR CAMERA SHUTTERS.
APPLICATION FILED FEB. 6, 1914.
1,128,790.
Patented Feb. 16, 1915.
2 SHEETS—SHEET 1.
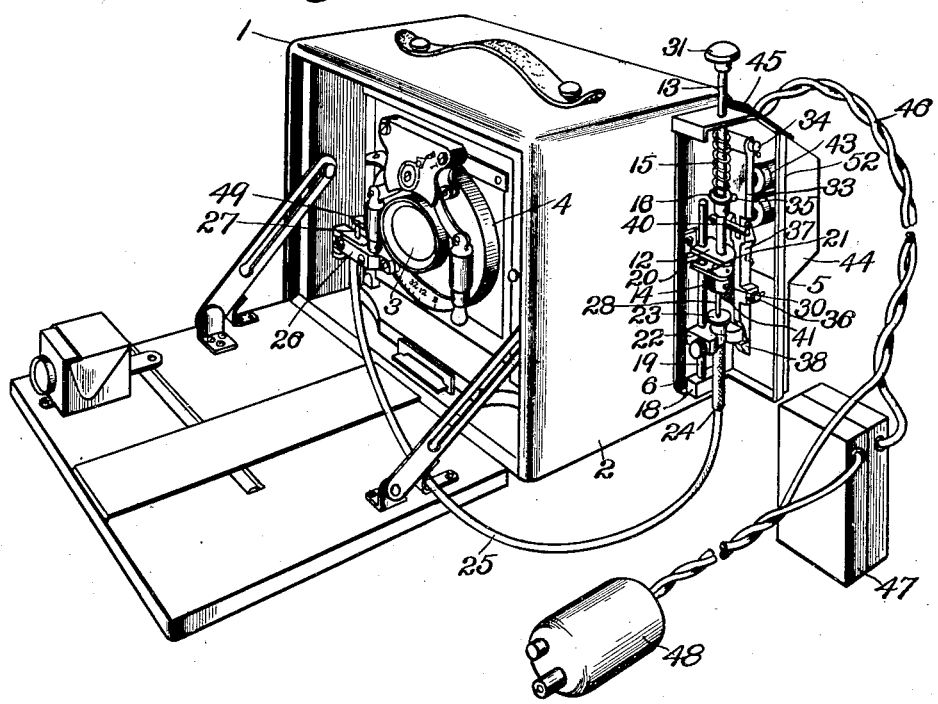
Fig. I.
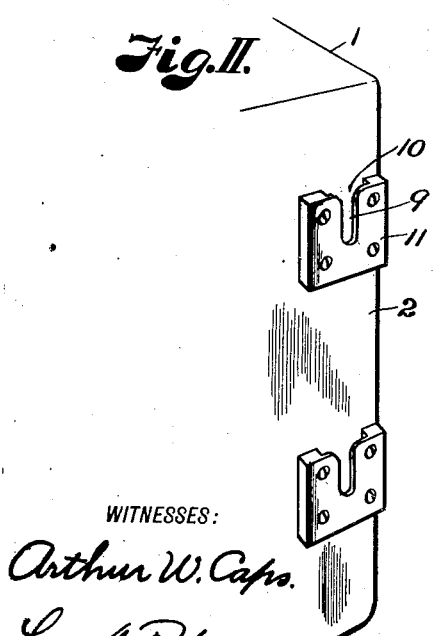
Fig. II.
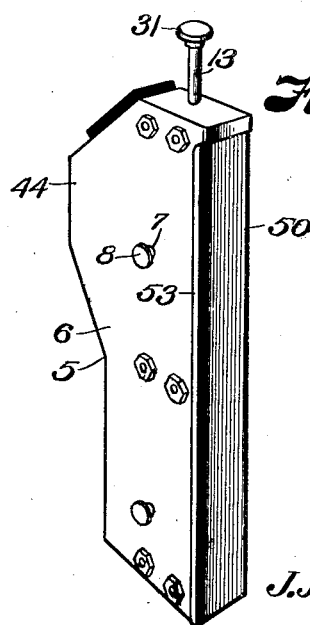
Fig. III.
WITNESSES:
Arthur W. Caps
Lynn A. Robinson
INVENTOR
J. M. Keil.
BY
Arthur C. Brown
ATTORNEY

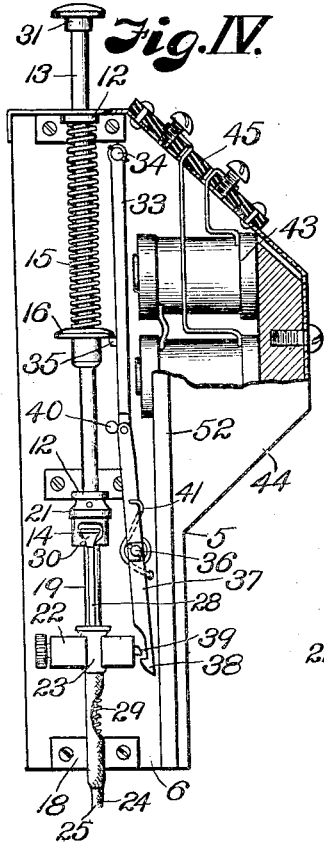
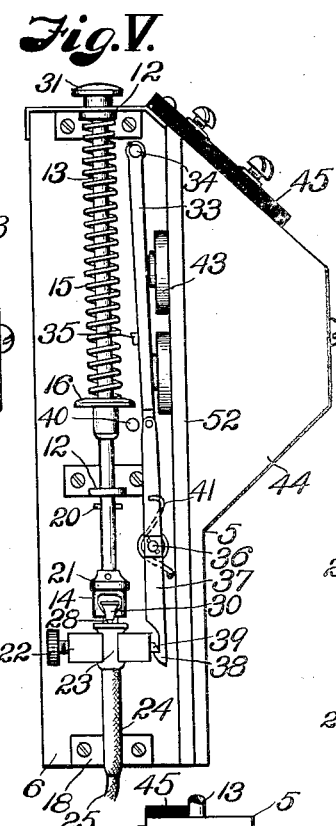
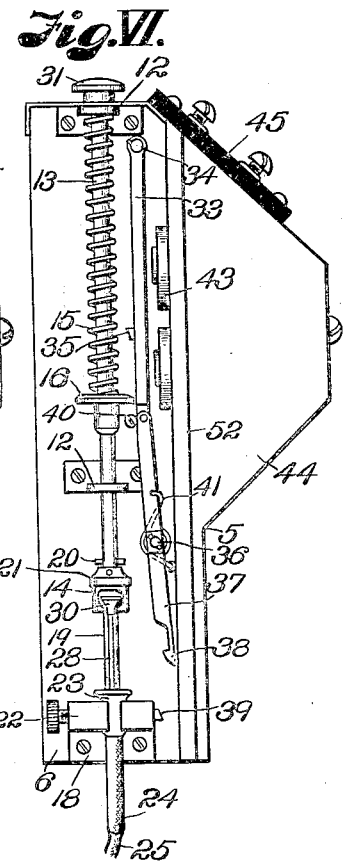
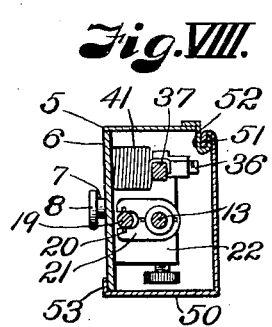
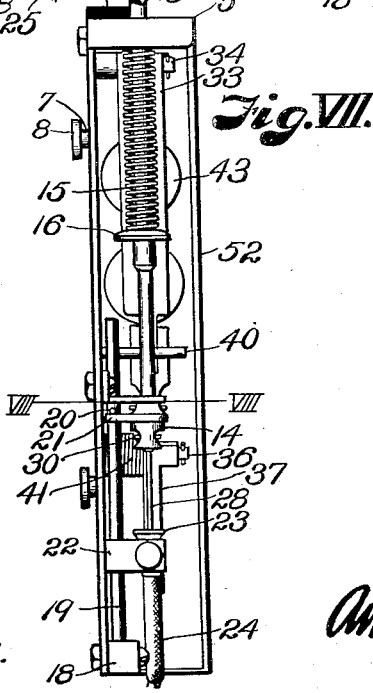

UNITED STATES PATENT OFFICE.

JOHN M. KEIL, OF KANSAS CITY, MISSOURI.

TRIP MECHANISM FOR CAMERA-SHUTTERS.

1,128,790. Specification of Letters Patent. Patented Feb. 16, 1915.

Application filed February 6, 1914. Serial No. 816,934.

*To all whom it may concern:*

Be it known that I, JOHN M. KEIL, a citizen of the United States, residing at Kansas City, in the county of Jackson and State of Missouri, have invented certain new and useful Improvements in Trip Mechanism for Camera-Shutters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to cameras, and more particularly to a device for actuating the shutters of such instruments; the principal object of the invention being to provide an electrically operated trip mechanism for controlling the shutter from a distance so that in exposing the negative the camera will not be subject to jar or vibration. In accomplishing this object I have provided the improved details of structure hereinafter described and illustrated in the accompanying drawings, wherein:—

Figure I is a perspective view of a camera equipped with a trip mechanism constructed in accordance with my invention; parts being removed for better illustration. Fig. II is a detail perspective view of one corner of the camera showing means for attaching the device to the case. Fig. III is a perspective view of the device. Fig. IV is an elevation of the device, showing the parts set to expose a negative; the cover being removed, and parts broken away for better illustration. Fig. V is a similar view, showing the position of the parts when the shutter is open. Fig. VI is a similar view, showing the position of the parts when the shutter is again closed. Fig. VII is an edge view of the device. Fig. VIII is a section on line VIII—VIII, Fig. VII.

Referring more in detail to the parts:—

1 designates a camera of ordinary construction, having a case 2, lens 3, and shutter mechanism 4. Near one of the rear corners of the camera is a trip mechanism 5, comprising a casing 6, from the rear face of which projects a pair of studs 7, having heads 8 which are adapted for projection into the slots 9 and recesses 10 respectively, of the plates 11 on the camera, so that the device may be removed when desired. Slidably mounted in bearings 12 of the casing 6 is a rod 13 which carries a grooved collar 14 at its lower end, and which is held yieldingly in lowered position by a coil spring 15 that surrounds the rod and bears against the flanged collar 16 and against one of the bearings 12. Also slidably mounted in one of the bearings 12, and in a bearing 18 near the bottom of the casing, is a rod 19, having a transverse pin 20 adapted for engagement by the slotted arm 21 on the rod 13, and a clamp 22 which lies immediately beneath the collar 14. The clamp 22 is adapted to receive the head 23 of a shutter operating device 24 comprising a flexible tube 25, which is attached to the head 23 and to a clamp 26 on the shutter 4, and which contains a flexible shaft 27 operably connected to a plunger 28. The plunger 28 is held yieldingly in elevated position by a coil spring 29 and is provided with a head 30 which nests in the grooved collar 14, in such a manner that when the knob 31 on the rod 13 is pulled upwardly, as shown in Fig. IV, the clamp 22 is also raised.

In order to hold the parts in elevated position, I have provided a trip mechanism which comprises a lever 33 pendently mounted on a shaft 34 on the casing 6, and provided with a laterally projecting pin 35 which passes beneath the flanged collar 16. Pivotally mounted on a stub shaft 36 on the casing 6 is a lever 37 having a hook 38 at its lower end adapted to engage the pin 39 on the clamp 22, the upper end of the lever being connected to the lever 33, so that the two are held yieldingly against a stop 40 by means of a coil spring 41. The lever 33 lies in the path of an electro-magnet 43 which is housed in an offset portion 44 of the casing 5 and is connected through the insulating block 45 and wires 46 with a battery 47 and a switch 48, whereby the current may be controlled to draw the lever toward the magnet or permit it to recede under the influence of the spring 41. The parts are entirely inclosed in the casing 6 by means of a sliding cover 50 which is adapted to inclose the front and one of the sides and is provided with an inturned edge 51 for seating in a groove 52 on the casing and with a laterally turned lip 53 for engaging one of the sides of the casing.

In using the device, presuming the parts to be constructed and assembled as described, the rod 13 is raised by means of the knob 31 so that the pin 35 passes beneath the flanged collar 16 and holds the collar 14 and clamp 22 in elevated position. The shutter is then set in the usual manner and the switch operated to close the circuit and energize the electro-magnet. As the lever 33 moves to the right under the influence of the magnet, the pin 35 releases the rod 13, and the lever 37 is oscillated to move the hook 38 beneath the pin 39 on the clamp 22, so that as the rod 13 moves under the influence of the spring 15 the collar 14 forces the plunger 28 against the tension of the spring 29 (Fig. V) and the flexible shaft 27, which is connected with the plunger 28, engages the laterally projecting lip 49 to open the shutter. If the switch is again actuated to break the circuit, the lever 33 recedes under the tension of the spring 41 and the hook 38 releases the clamp 22 to the influence of the spring 29 (Fig. VI) to close the shutter.

Having thus described my invention, what I claim as new therein, and desire to secure by Letters-Patent, is:—

1. The combination with a movable member, of means for urging said member in one direction, a jointed latch having stops on its several members, and means for actuating one of said members to bring all of the members into successive holding engagement with said movable member.

2. The combination with a movable member, of means for urging said member in one direction, a latch comprising pivotally connected members, each having a stop adapted for separate holding engagement with the movable member, and means for moving one of said members to throw the other into locking position.

3. The combination with a movable member, of means for urging said member in one direction, pivotally connected latch members each having stationary pivotal mounting and each having a stop adapted for engagement with the movable member, means for yieldingly tensioning the latch in one direction, and a magnet for actuating the latch in the opposite direction, for the purpose set forth.

4. A trip mechanism for camera shutters, comprising means for actuating a shutter, a step-down latch mechanism, means for actuating said latch mechanism to produce initial movement of said shutter actuating means, and a spring carried by said shutter actuating means for ultimately actuating the same.

5. A trip mechanism for camera shutters, comprising a shutter actuating device, a step-down latch mechanism, an electro-magnet for actuating said latch mechanism to produce initial movement of said actuating device, and a spring carried by said actuating device for ultimately actuating the same when released by said magnet.

6. A trip mechanism for camera shutters, comprising means for actuating a shutter, a step-down latch mechanism for actuating said means, and means for removably mounting said shutter actuating means and step-down latch mechanism on a camera.

7. A trip mechanism for camera shutters, comprising a shaft, a guide tube for said shaft, means for connecting said tube to a shutter, a clamp for the opposite end of said tube, a rod slidably mounted adjacent said clamp, and means for coöperatively actuating said rod and clamp to reciprocate said shaft.

8. A trip mechanism for camera shutters, comprising a shaft and guide tube having connection with a shutter, a clamp for the opposite end of said tube, a rod slidably mounted adjacent said clamp and operatively connected with said shaft, a pair of latches adjacent said rod and clamp, and means for actuating said latches to alternately release said rod and clamp.

9. A trip mechanism for camera shutters, comprising a casing, a rod slidably mounted in said casing and yieldably tensioned in one direction, a collar on said rod, a grooved head on said rod, a second rod slidably mounted in said casing adjacent said first named rod, a clamp on said second rod, a rod in line with said grooved head, a latch pendently mounted in said case and adapted to hold said first named rod in raised position, a stop for said latch, a second latch pivotally mounted in said case and operatively connected with said first named latch, a hook on said second latch for engaging said clamp, a spring for yieldingly holding both of said latches against said stop, and means adjacent said first named latch for controlling said latches to alternately engage said rod and clamp.

10. A trip mechanism for camera shutters, comprising a casing, a rod slidably mounted in said casing, a flanged collar, a grooved head and a slotted arm on said rod, a spring for yieldingly tensioning said rod in one direction, a second rod slidably mounted in said casing, a transverse pin in said rod adapted for engagement by said slotted arm, a clamp on said rod in line with said grooved head, a lever pendently mounted in said casing, a pin on said lever adapted to engage said flanged collar when in tensioned position, a lever pivotally mounted in said case having pivotal connection with said first named lever at one end, and having a hook at the opposite end adapted to engage said clamp, a stop for said levers, a spring for yieldingly holding said levers to said stop, an electro-magnet adjacent said first named lever, and a switch for controlling said magnet whereby said flanged collar is released to the tension of its spring, the clamp held inert, and the clamp ultimately released, for the purpose set forth.

11. A trip mechanism for camera shutters, comprising a casing, a rod slidably mounted in said casing; a flanged collar, a grooved head and a slotted arm on said rod; a spring for yieldingly tensioning said rod in one direction, a knob for manually actuating said rod, a second rod slidably mounted in said casing, a transverse pin in said rod adapted for engagement by said slotted arm, a clamp on said rod in line with said grooved head, a flexible tube having one end mounted in said clamp and the other end on a shutter, a flexible shaft in said tube, a plunger operatively connected with said flexible shaft, a spring for yieldingly tensioning said plunger in one direction, a head on said plunger adapted to nest in said grooved head, a lever pendently mounted in said casing, a pin on said lever for engaging said flanged collar in its tensioned position, a second lever pivotally mounted in said casing having pivotal connection with said first lever, and having a hook for engaging said clamp in its set position, a stop for said levers, a spring for yieldingly holding said levers to said stop, an electro-magnet adjacent said first named lever, a switch for controlling said magnet whereby said flanged collar is released and the clamp held to move said flexible shaft toward said shutter, whereby said clamp is ultimately released by the plunger spring to move said flexible shaft away from said shutter.

In testimony whereof I affix my signature in presence of two witnesses.

JOHN M. KEIL.

Witnesses:
ARTHUR W. CAPS,
L. E. COATS.